June 20, 1961  S. SAJ  2,989,290
HEAT TRANSFER DEVICE
Filed April 18, 1958

INVENTOR.
STANLEY SAJ
BY
McMorrow, Berman & Davidson
ATTORNEYS

United States Patent Office 2,989,290
Patented June 20, 1961

2,989,290
HEAT TRANSFER DEVICE
Stanley Saj, Post Office Drawer 222, Peru, Ill.
Filed Apr. 18, 1958, Ser. No. 729,372
1 Claim. (Cl. 257—130)

It is a well-known fact that practically all of the modern day automobiles, trucks, buses, tractors, and to all intents and purposes any engine driven vehicles employ heat transfer means in the nature of a radiator and/or heater cores for the purposes of either cooling the water for the engine or for heating the inside of the vehicle in cold weather. Heat transfer devices of this type are likewise utilized in various types of aircrafts for oil cooling as well as controlling engine temperatures and for heating the cabin. Other applications of such heat transfer problems occur in condensers, power plants, air conditioning units and refrigeration. The cooling or heating medium may comprise water, other fluids, liquids, steam, vapor, oil, or gaseous substances which course through the channels in a radiator core which, in turn, heats or cools the fins thereof to produce the desired heat transfer. It has been accepted as a fact for a number of years that the most efficient method of transferring heat wherein a radiator is employed comprises the use of a cellular type core. However, the disadvantage of this type of construction was that it would not withstand the internal working pressure capably handled by tubular type cores.

Heretofore, only the outside faces of radiator cores have been bonded together by soldering by what is known as the dip process, wherein the entire core is dipped into a large flat tray of molten solder, thereby sealing the exterior edges of the radiator channels. It has been found that a core, so constructed, will not withstand the high pressures required in modern heat transfer devices.

Present day heating and cooling systems operate on high internal pressures, thereby requiring stronger internal bonding construction of the core assemblies.

Consequently, one of the primary objects of this invention is to provide means for connecting the channel separators that form any multiple number of channels in any given core in such a manner as to permit the core to safely handle high internal working pressures.

Another object of this invention is to provide in heat transfer cores of the type described additional strength in the center of the channel separators without increasing, materially, the weight of the core material which would, of course, react to deter heat transfer.

A further object of this invention is to provide a core of the cellular type wherein the walls or channel separators are provided with portions which mutually cooperate in centering the core during assembly.

This invention contemplates, as a still further object thereof, the provision of a cellular type radiator core which is noncomplex in construction and assembly, inexpensive to manufacture, and durable in use.

Other and further objects and advantages of the instant invention will become more evident from a consideration of the following specification when read in connection with the annexed drawing, in which.

Figure 1:
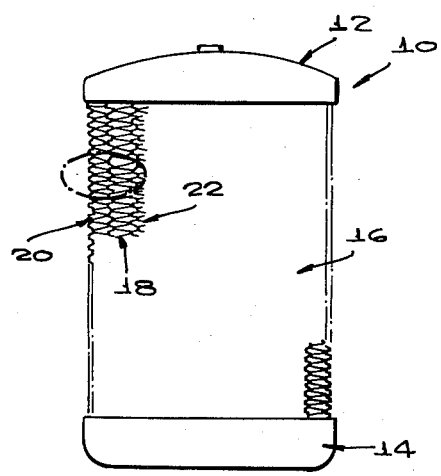
FIGURE 1 is a front elevational view illustrating a radiator core for an automobile or other vehicle, the core being of the cellular type, and constructed in accordance with the present invention.

Referring now more specifically to FIGURE 1 of the drawing, reference numeral 10 designates, in general, a conventional automobile radiator including an upper header or inlet tank 12, a lower header or outlet tank 14, and the intermediate heat transfer device or core 16 constructed in accordance with the teachings of this invention. When used as an automobile radiator, water or other cooling medium passes from the water jacket of the engine to the upper tank 12 and then flows downwardly through the radiator channels or passages of the core 16 and into the lower tank 14 for return to the engine. As the cooling medium passes through the core, the heat absorbed by it in the engine block is thrown off or transferred to a stream of air passing through the core. The core 16 is seen to be constructed and assembled from a plurality of units 18, 20 and 22 (only three being shown in detail), each identical in structure, and consequently, a description of one is the description of the others. Hence, like reference numerals identify corresponding elements in each unit.

The unit 18 is seen to comprise (1) an elongated accordion or zig-zag shaped fin 24 having alternating apices 26, 28 on opposite sides thereof and (2) a pair of corrugated side members 30, 32 to the apices 34, 36 of which, respectively, are secured (as by soldering), the apices 26, 28 of the fin 24. The opposed ends 38, 40 of the side members 30, 32 are bent inwardly to form overlapping tabs 42, 44 soldered, or otherwise, fixedly secured together.

Figure 2:
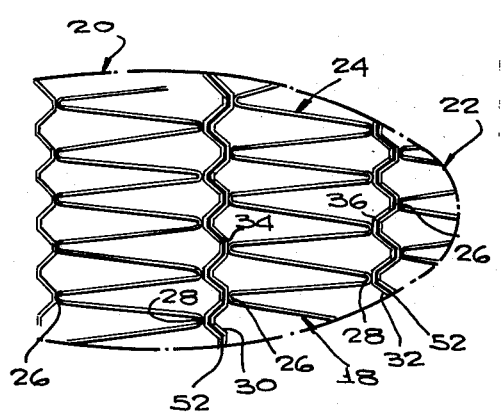
FIGURE 2 is an enlarged fragmentary front elevational view of the core illustrated in FIGURE 1.
Figure 3:
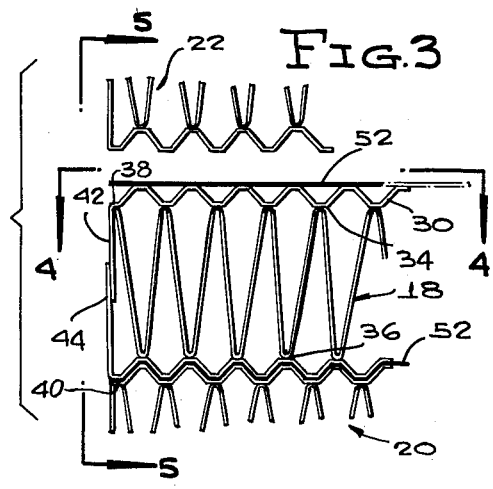
FIGURE 3 is a front elevational view of the core rotated 90 degrees with respect to FIGURE 2, and illustrating an assembly step thereof.
Figure 4:
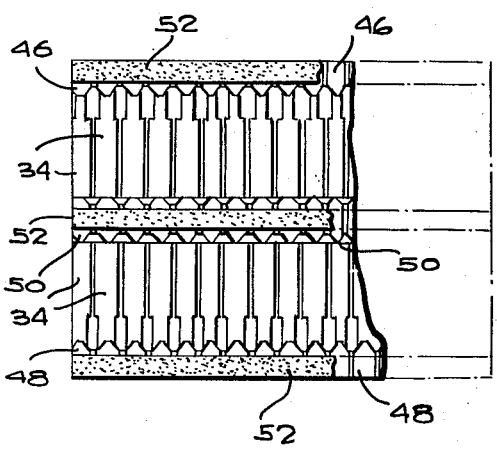
FIGURE 4 is a top plan view of the core illustrated in FIGURE 3, FIGURE 4 being taken substantially on the horizontal plane of line 4—4 of FIGURE 3, looking in the direction of the arrows.
Figure 5:
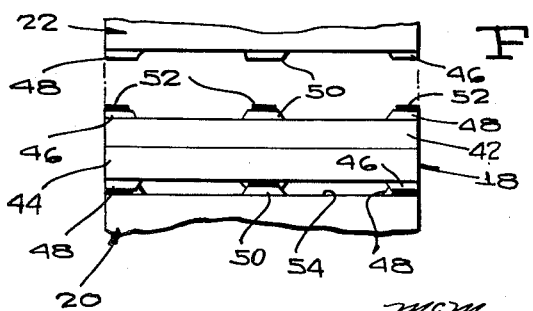
FIGURE 5 is an end elevational view taken substantially on the vertical plane of line 5—5 of FIGURE 3, looking in the direction of the arrows.

FIGURE 4 is a top plan view of the side member 30, the corresponding view of the side member 32 being identical, and as shown therein (also see FIGURE 5), the side member 30 is formed with a plurality of upstanding series of corrugations 46, 48 and 50 which are disposed in aligned spaced relation adjacent each longitudinal marginal edge and centrally thereof, forming between each adjacent pair thereof outwardly opening grooves therebetween, the function of which will become apparent below. As is seen in FIGURES 2 and 3, the alternating apices of the corrugations 46, 48 and 50 are secured by the soldering referred to above to the alternating apices 26, 28 of the fin or strip 24.

To form the core 16, a plurality of the units are assembled and fixedly secured together. The assembly steps are shown in FIGURES 3 and 4, wherein it is seen that a strip of soldering material 52 is laid longitudinally across each series of corrugations 46, 48, 50 of one of the units (20) after which a second unit (18) is superposed thereagainst with the corrugations 46, 48 of the unit 18 disposed in nesting relation relative to the corrugations 46, 48 of the unit 20, respectively, or conversely thereof. In either case, the corrugations 50 of the units 18, 20 are disposed in nesting relation relative to each other.

The solder 52 is now raised to its melting point to fuse and connect the unit 18 to the unit 20 and to simultaneously form therewith two water passages or channels 54 between the units 18 and 20, the aforementioned grooves being brought into registry with one another. The same assembly steps are employed to join the unit 22 to the unit 18. Succeeding units (not shown), are simultaneously connected, one with another.

The core 16 is preferably formed of copper and may be made of any desirable length, width or depth.

Having described and illustrated one embodiment of this invention in detail, it will be understood that the same is offered merely by way of example, and that the present invention is to be limited only by the scope of the appended claim.

What is claimed is:

A radiator core comprising a plurality of identically constructed rigidly connected together core units, each of said core units comprising an elongated strip of material bent into a substantially zigzag configuration, an elongated pair of side members, each of said side members being disposed, respectively, on opposite sides of said strip, each adjacent pair of ends of said side members being overlapped over the opposed ends of said strip, fusible means rigidly connecting together each pair of overlapped ends of said strip, each of said side members including a series of upstanding corrugations at each marginal edge thereof and a similar series of upstanding corrugations extending longitudinally and centrally thereof, said corrugations having apices which extend parallel to the apices of said strip and alternating apices of said side members being in contact with the apices of said strip, each adjacent pair of said series of corrugations forming an outwardly opening groove therebetween, fusible means fixedly securing alternate apices of said upstanding corrugations to the adjacent alternate apices of said strip to form a rigid unit, said radiator core comprising a plurality of said units disposed in juxtaposition with the side members of each pair of adjacent units disposed in confronting relation and with said grooves opening toward each other, said upstanding corrugations on said confronting side members nesting with one another, fusible means interposed between said nested corrugations to rigidly secure together said adjacent units whereby said confronting grooves form a fluid passage on oppositely disposed sides of said secured centrally positioned corrugations.

References Cited in the file of this patent

UNITED STATES PATENTS

| 1,421,546 | Parkin | July 4, 1922 |
| 2,079,222 | Miller | May 4, 1937 |
| 2,133,502 | Emmens | Oct. 18, 1938 |
| 2,594,008 | Getz | Apr. 22, 1952 |